United States Patent [19]

Turnbull

[11] 4,449,176
[45] May 15, 1984

[54] SINGLE PHASE REGENERATION WITH A POLYPHASE RECTIFICATION POWER CIRCUIT

[75] Inventor: Fred G. Turnbull, Scotia, N.Y.

[73] Assignee: General Electric Company, Schenectady, N.Y.

[21] Appl. No.: 382,332

[22] Filed: May 26, 1982

[51] Int. Cl.³ .............................................. H02P 13/24
[52] U.S. Cl. ........................................ 363/81; 363/126
[58] Field of Search ....................... 363/37, 65, 79–81, 363/63, 89, 125–127; 318/762, 803, 376, 345 AB

[56] References Cited

U.S. PATENT DOCUMENTS

| | | | |
|---|---|---|---|
| 3,909,698 | 9/1975 | Nill | 363/79 |
| 4,193,111 | 3/1980 | Wester | 363/126 |
| 4,272,807 | 6/1981 | Gallagher | 363/126 |
| 4,328,454 | 5/1982 | Okuyama et al. | 363/79 |
| 4,353,023 | 10/1982 | Kawada et al. | 318/762 |
| 4,362,976 | 12/1982 | Fujioka et al. | 363/63 |

FOREIGN PATENT DOCUMENTS 56-111922 9/1981 Japan ..................................... 363/37

OTHER PUBLICATIONS

"The Forced Commutated Rectifier as a Regenerative Rectifier" by J. W. A. Wilson, IEEE Transactions on Industry Applications, vol. 1A-14, No.:4, Jul./Aug., 1978, pp. 335–340.

Primary Examiner—William H. Beha, Jr.
Attorney, Agent, or Firm—William H. Steinberg; James C. Davis, Jr.; Marvin Snyder

[57] ABSTRACT

A polyphase rectifier power circuit with single phase regenerative capability provides motoring power from a polyphase supply and returns single phase regenerative power to the supply. One embodiment uses pulse width modulation of the regenerative rectifier to limit line-to-line current flow through the regenerative rectifier during regeneration while another embodiment uses 180° conduction in the regenerative rectifier with the substitution of two thyristors for two diodes in the rectifier.

7 Claims, 2 Drawing Figures

SINGLE PHASE REGENERATION WITH A POLYPHASE RECTIFICATION POWER CIRCUIT

This invention is related to my copending application Serial No. 365,706, filed Apr. 5, 1982 and assigned to the same assignee as the present invention.

BACKGROUND OF THE INVENTION

This invention concerns regenerative rectifier apparatus capable of ac-to-dc rectification and power regeneration from the dc load back to the ac supply.

A regeneration feature is often a requirement in a machine tool drive system in order to achieve rapid response to speed command changes. If a speed command to the motor of the machine tool is reduced and the motor is not under load, it is not necessary to wait for friction and windage losses to slow the motor down when regeneration is available to convert the energy in the rotational inertia of the motor to electrical energy.

In some prior art drive systems, the regenerated energy is returned to the dc link where it is dissipated in a resistor in series with a controlled switch. This method is undesirable because of the size and heat dissipation in the resistor and the reduction in system efficiency.

Other systems that return the regenerated energy to the ac supply require multiple thyristors connected between the ac system and the dc link. These thyristors require additional power rated commutation components to force commutate or turn-off the load current carrying thyristors. The commutation components are a multitude of reactors, capacitors, diodes and auxiliary power supplies. A system of this type is described in "The Forced Commutated Rectifier as a Regenerative Rectifier" by J. W. A. Wilson, IEEE Transactions on Industry Applications, Vol. IA-14, No. 4, July/August 1978, pps. 335-340. The present system does not require the use of dissipative resistors or complex force commutated thyristor circuits to achieve the return of regenerated energy to the ac supply.

An object of the present invention is to provide regenerative capability to an ac supply from an ac-to-dc-to-ac adjustable voltage, adjustable frequency, ac motor drive system.

Another object of the present invention is to provide regenerative capability to an ac supply from an ac-to-dc-to-dc adjustable voltage dc motor drive system.

A further object of the present invention is to provide in an ac-to-dc rectifier the capability of regeneration of power from a dc source at the output of the rectifier to the ac supply by reversing the direction of current flow from the output of the rectifier, rather than by reversing the rectifier output polarity.

A still further object of the present invention is to provide regenerative capability to a static ac-to-dc motor drive system by returning single phase power to the polyphase supply.

SUMMARY OF THE INVENTION

In one embodiment of the present invention, there is provided a polyphase rectifier circuit with single phase regenerative capability supplying a load and comprising a three phase bridge rectifier including a plurality of rectifying elements. The three phase rectifier is coupled to an external three phase ac source. Controllable switches with self-commutating ability are coupled in inverse parallel with the rectifying elements in the first and second phases of the rectifier, thereby forming a single phase inverter. The direction of the current flowing to the load is sensed as well as the current flowing in the third phase of the rectifier.

A control circuit is coupled to the controllable switches and is responsive to the direction of current flow to the load and the current flow in the third phase of the rectifier for switching the controllable switches during regeneration. The control circuit compares the relative voltages of the first and second phases of the external source to determine the conduction interval of the controllable switches. The control circuit is responsive to the current amplitude in the third phase of the rectifier for pulse width modulating the switching elements to maintain the third phase current within a predetermined positive and negative current amplitude limit.

In another embodiment of the present invention, a polyphase rectifier circuit with single phase regenerative capability supplying a load is provided. In this embodiment, pulse width modulation of the controllable switching elements is not required to limit the current flow in the third phase of the rectifier. The rectifier comprises a three phase bridge including a plurality of rectifying elements in the first and second phases and at least one controllable rectifying element in the third phase, and is coupled to an external three phase ac source. A controllable switch wih self-commutating ability is coupled in inverse parallel with the rectifying elements in the first and second phases of the rectifier. The controllable switches form a single phase inverter feeding into the first and second phases of the external souce. The direction of current flow to the load is sensed.

A control circuit is coupled to the controllable switches and the controllable rectifying element and is responsive to the direction of current flow to the load. The control circuit switches on the controllable rectifying element during rectification and switches on the controllable switches during regeneration. The relative voltages of the first and second phases of the external source are compared by the control circuit to determine the conduction intervals of the controllable switches to provide regeneration current to the first and second phases of the source.

BRIEF DESCRIPTION OF THE DRAWING

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

DETAILED DESCRIPTION OF THE INVENTION

Figure 1:
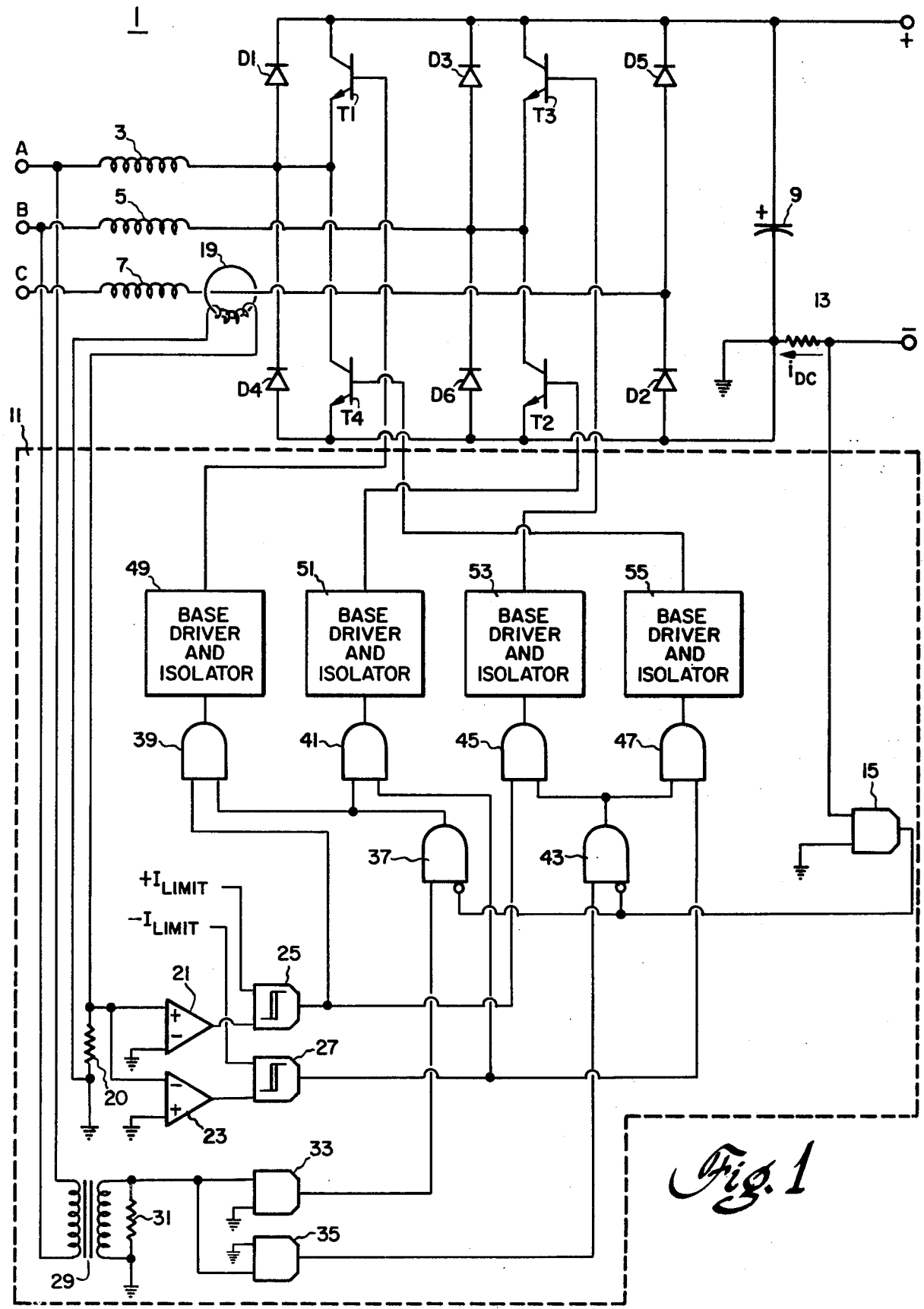
FIG. 1 is a part schematic, part block diagram representation of a polyphase rectifier circuit with single phase regenerative capability in accordance with the present invention.

Referring now the drawing wherein like numerals indicate like elements, there is shown in FIG. 1 a regenerative rectifier 1 providing three phase rectification and single phase regeneration to an ac source. Three phase ac power is supplied from an external source (not shown) through three inductors 3, 5, and 7, respectively, to a three phase diode bridge comprising diodes D1, D2, D3, D4, D5 and D6. The three phases are referred to as first, second and third or A, B and C, respectively. Diode D1 and D4 are connected in series and receive ac power from phase A through inductor 3. Diodes D3 and D6 are connected in series and receive ac power from phase B of the ac source through inductor 5. Diodes D5 and D2 are connected in series and receive ac power from phase C of the ac source through inductor 7. Each pair of diodes D1 and D4, D3 and D6, and D5 and D2 is connected between the dc rails of the rectifier. A capacitor 9 is also connected between the dc rails. The output of the rectifier can serve as the uncontrolled dc bus of an adjustable speed motor drive system. Controllable switches with self-commutating ability shown as bipolar transistors T1, T2, T3 and T4 in the present embodiment, are connected in inverse parallel with diodes D1, D6, D3 and D4, respectively. A controllable switch with self-commutating ability can be turned off by means of a control electrode. Devices connected in inverse parallel are connected so that when one device is conducting the other is reverse biased. The combination of the diode with the transistor connected across the diode in inverse parallel could be replaced by a field effect transistor which has an inherent inverse parallel pn junction.

A control 11 provides base drive signals to the transistors T1, T2, T3 and T4 which form a single phase inverter. A current sensor which is shown as a current shunt resistor 13, has one end connected to the junction of the anode of D2 and capacitor 9 which also serves as a logic circuit ground. The other end of resistor 13 is connected to the negative dc output terminal. The positive dc output terminal is connected to the cathode of D5. The voltage drop across resistor 13 is proportional to the current flowing from the regenerative rectifier through the negative dc rail to the load (not shown). The voltage drop across the resistor 13 is applied to the input of an analog-to-digital comparator 15 with the lower input terminal connected to the logic circuit ground. Comparator 15 and the other analog-to-digital comparators discussed hereinbelow provide a high (logic ONE) output when the signal applied to the upper input terminal is greater than the signal at the lower input terminal and a low (logic ZERO) output when the signal applied at the upper input terminal is less than the signal at the lower input terminal. The inputs to the comparator are arranged so that when current is flowing from the regenerative rectifier to the dc load ($i_{DC}$ is positive), the output of the comparator is high.

A current sensor which also provides signal isolation, shown as a current transformer 19, is connected to monitor the current flowing in phase C of the ac source to the regenerative rectifier. The output of the current transformer is connected to a positive comparator 21 and a negative comparator 23. A burden resistor 20 is connected across the output terminals of the current transformer 19. The output of the positive comparator is connected to one input of an analog-to-digital comparator with hysteresis 25 and a positive signal representative of the maximum desirable positive current $+I_{LIMIT}$ in phase C is connected at the other input of comparator 25. Positive current is defined as current flowing from the ac source to the rectifier. The output of the negative comparator 23 is connected to one input of an analog-to-digital comparator with hysteresis 27, while a negative signal representative of the maximum desirable negative current $-I_{LIMIT}$ in phase C is connected at the other input of comparator 27. The line voltage $e_{AB}$ provides an input to an isolation transformer 29. A burden resistor 31 is coupled across the output of the transformer. The output of the transformer is coupled to a positive analog-to-digital comparator 33 and a negative analog-to-digital comparator 35. A two input AND gate 37 has connected to one inverting terminal the output of comparator 15. Connected to the noninverting terminal is the output of comparator 33. The output of AND gate 37 is connected to one input of two input AND gate 39 and is connected to one input of two input AND gate 41. Coupled to the other inputs of AND gates 39 and 41 is the output of comparators 25 and 27, respectively. A two input AND gate 43 has coupled to its inverting and noninverting terminals, respectively, the output of comparators 15 and 35, respectively. The output of AND gate 43 is coupled to one input of each of two input AND gates 45 and 47, respectively. The other input of AND gates 45 and 47, respectively, is connected to the outputs of comparators 25 and 27, respectively. The outputs of AND gates 39, 41, 45 and 47 are connected to base driver and isolation circuits 49, 51, 53 and 55, respectively. The base driver and isolation circuits 49, 51, 53 and 55 provide signals to the bases of transistors T1, T2, T3 and T4, respectively.

In operation, the circuit of FIG. 1 serves as the interface between an ac supply and a dc link of an adjustable speed ac or dc motor drive system. The circuit of FIG. 1 supplies rectified three phase power via the three phase bridge D1, D2, D3, D4, D5 and D6 during motoring. Motoring is defined as power flow from the ac supply to the dc load. During motoring, diodes D1–D6 sequentially conduct current for 120° intervals and transistors T1–T4 are not conducting.

During regeneration conditions when the load is generating power, single phase power is returned to the first and second phase of the ac source from the load via the single phase inverter comprised of transistors T1–T4. The dc output voltage across capacitor 9 does not change sign, therefore, the dc current must reverse direction for the power flow to reverse. Control circuit 11 provides the base drive signals to transistors T1–T4 during regeneration. Current sensor 13 determines the direction of dc current to the load. Positive current is motoring current and zero or negative current is regeneration current. When positive $i_{DC}$ current is detected, a logical ONE output is provided at the output of analog-to-digital comparator 15 and is inverted at the inverting inputs of AND gates 37 and 43, disabling AND gates 37 and 43 and preventing the transistors T1–T4 from being biased into conduction. The line-to-line voltage $e_{AB}$ of the ac supply during one positive half cycle causes positive analog-to-digital comparator 33 to provide a logical ONE to AND gate 37 and during the negative half cycle causes negative analog-to-digital comparator 35 to provide a logical ONE to AND gate 43.

The conduction interval for a single phase inverter is 180° while the conduction interval for a three phase rectifier is 120°. Transistors T1 and T2 can not be biased into conduction for the entire 180° when phase A is greater than phase B nor can transistors T3 and T4 be biased into conduction for the entire subsequent 180° interval when phase B is greater than phase A. For 60° of the 180° conduction interval of transistors T3 and T4, the positive phase C voltage is greater than the positive phase B voltage causing a line-to-line path through the regenerative rectifier elements from phase C through inductor 7, diode D5, transistor T3 and inductor 5 to phase B, which is virtually a short circuit path. During a different 60° interval of the 180° conduction interval of transistors T3 and T4, the negative phase C voltage is more negative than the negative phase A voltage causing a circulating current path from phase A through inductor 3, transistor T4 and diode D2 to phase C. Thus, for a 60° interval, transistor T3 has to be pulse width modulated to limit current flow and for another 60° interval transistor T4 has to be pulse width modulated. Similarly, for the 180° conduction interval of transistors T1 and T2, there is a 60° interval during which the positive phase C voltage is greater than the positive phase A voltage, causing a circulating current path through inductor 7, diode D5 and transistor T1 and for a different 60° interval, when the negative phase C voltage is more negative than the phase B voltage, the circulating current path is established through inductor 5, transistor T2, diode D2 and inductor 7. In addition to the current from the ac source, regenerative current also flows in the short circuit current paths.

In order to limit the short circuit current and protect the circuit elements, transistors T1–T4 are operated in a pulse width modulated mode for approximately 120° of their 180° conduction intervals. To determine when the appropriate transistor should be pulse width modulated, the instantaneous line current in phase C is sensed by current transformer 19 and compared to a positive limit in analog-to digital comparator with hysteresis 25 and to a negative limit in an analog-to-digital comparator with hysteresis 27. When line current is more positive than the positive limit or more negative than the negative limit, a corresponding transistor is turned off and when the positive or negative limits are no longer exceeded and motoring is still not detected the transistor is again biased into conduction. The hysteresis in the comparator creates a difference between the response to an increasing and a decreasing signal thereby avoiding unnecessary switching. During the 180° conduction period of transistors T1 and T2, for example, which occurs when motoring is not detected by comparator 15 and when the voltage of phase B is more positive than the voltage of phase A as determined in comparator 33, AND gate 37 is enabled. The output voltage of comparator 25 pulse width modulates transistor T1 by way of AND gate 39 when the positive limit is exceeded. Similarly, the output voltage of comparator 27 pulse width modulates transistor T2 by way of AND gate 41 when the negative limit is exceeded. During the 180° conduction period of transistors T3 and T4, transistors T3 and T4 are pulse width modulated in similar fashion to keep the current in phase C between the positive and negative limits, respectively.

Figure 2:
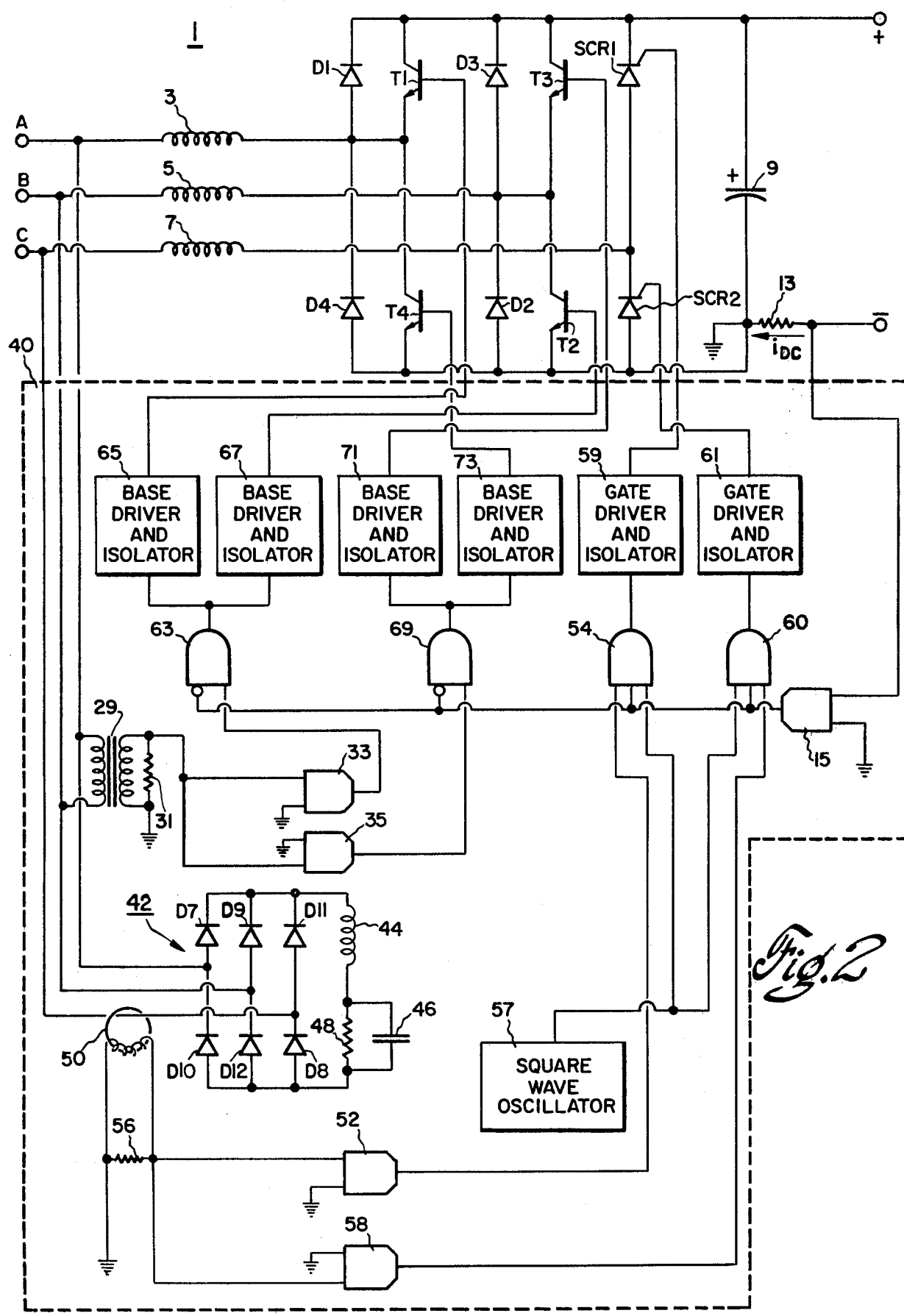
FIG. 2 is a part schematic, part block diagram representation of another embodiment of a polyphase rectifier circuit with single phase regenerative capability in accordance with the present invention.

Referring now to FIG. 2, a modified arrangement of FIG. 1 is shown that overcomes the need of pulse width modulation to limit short circuit currents in the rectifier circuit during regeneration. The full wave bridge and single phase inverter of FIG. 2 is the same as that shown in FIG. 1 except that diodes D5 and D2 of FIG. 1 have been replaced by thyristors SCR1 and SCR2, respectively, and that control 11 in FIG. 1 has been replaced by a control 40. The control 40 comprises a three phase full wave diode bridge having diodes D7–D12. The pairs of diodes D7 and D10, D9 and D12, and D11 and D8 are connected in series. Connected at the junction of the first, second and third pair, respectively, is the first, second and third phase of the external ac supply, respectively. Connected across the output of the dc bridge 42 is an inductor 44 in series with the parallel combination of a resistor 48 and a capacitor 46. The inductor, resistor and capacitor are selected to draw current in phase with the current drawn in the bridge having diodes D1–D4 and thyristors SCR1–SCR2, during rectification. A transformer 29 is connected across phases A and B as shown in FIG. 1 and the output of the transformer is connected to a positive and a negative analog-to-digital comparator 33 and 35, respectively, as in FIG. 1. The voltage drop across resistor 13 which operates as a current shunt is used to sense current flow to the load as in FIG. 1. The voltage drop across the current shunt is supplied to analog-to-digital comparator 15.

A current sensor 50 senses the current flowing to phase C of the full bridge rectifier 42. A burden resistor 56 is connected across the output of the current sensor 50. The sensed signal is applied to a positive and a negative analog-to-digital comparator 52 and 58, respectively. The output of the positive comparator 52 is coupled to one input of a three input AND gate 54. The second input to AND gate 54 is fulfilled by a square wave signal from a square wave oscillator 57 and the third input is fulfilled by the output signal of comparator 15. The output of the negative comparator 58 provides one input to a three input AND gate 60. The output of the square wave oscillator 57 is connected to the second input of AND gate 60 and the output of the comparator 15 is connected to the third input. The outputs of AND gates 54 and 60 are connected to gate drive and isolator circuits 59 and 61, respectively, which provide a gate signal to thyristors SCR1 and SCR2, respectively.

The output of positive comparator 33 is connected to the noninverting input of a two input AND gate 63 and the output of the comparator 15 is connected to the inverting input of AND gate 63. The output of AND gate 63 is connected to base driver and isolator circuits 65 and 67 which are connected to bases of transistors T1 and T2, respectively. The output of negative comparator 35 is connected to the noninverting input of a two input AND gate 69. The output of the comparator 15 is connected to the inverting input of AND gate 69. The output of the AND gate 69 is connected to base driver and isolator circuits 71 and 73 which are connected to the bases of transistors T3 and T4, respectively.

In operation during motoring, it is desired to have thyristors SCR1 and SCR2 each conduct for a 120° conduction period corresponding to the conduction period of the corresponding diodes in phase C of the full wave rectifier bridge 42. The instantaneous current in phase C of rectifier 42 is sensed by current transformer 50. When positive current is sensed, positive analog-to-digital comparator 52 provides a high (logic ONE) signal to AND gate 54. If power is being supplied to the load (not shown), the output of the analog-to-digital comparator 15 is high (logic ONE) and also is provided to AND gate 54. The third input signal to AND gate 54 is the square wave oscillator 57 output signal. The output frequency of the oscillator can be, for example 10,000 Hz. The 10,000 Hz pulses received at the gate of thyristor SCR1 occur so often during a 120° time interval of the 60 Hz waveform that the thyristor remains gated on and conducts positive phase C current. The thyristor gate could alternatively be continuously gated by a constant gate signal during the conduction period as long as the other two inputs to the AND gate 54 are high. The advantages of the high frequency gating signal is that isolation between the control circuit and the thyristors can be easily achieved by using a high frequency transformer shown for isolators. Similarly, the current in phase C is negative and power is being supplied to the load, thyristor SCR2 receives the 10,000 Hz signal at its gate. When power is not being supplied to the load, AND gates 54 and 60 are not enabled, resulting in thyristors SCR1 and SCR2 not being gated and thereby eliminating the short circuit current paths through phase C, described in conjunction with the apparatus of FIG. 1. The transistors can be biased into conduction for each of their 180° conduction periods. During the transition from motoring to regeneration, suitable sensors determine that thyristors SCR1 or SCR2 are not conducting before the current is allowed to reverse in the DC bus.

It is also possible to continuously gate the thyristors during motoring rather than gating the thyristors only durying their respective 120° conduction intervals during motoring. The bridge circuit 42 would not be needed and two input AND gates rather than the three input AND gates 54 and 60 would be used. While continuous gating reduces the control circuit components required, it also introduces losses which result when the thyristors are reversed biased during motoring while they are being gated.

The two embodiments of a single phase regenerative rectifier circuit which can use either power transistor or field effect transistors together with a polyphase rectifier circuit have been described. Only a single-phase regenerative rectifier has been provided to reduce the cost of the regeneration feature. When multiple motor drives are being supplied by a single phase regenerative polyphase rectification circuit, for example, a reduced regenerative power handling capability will be needed if the motors are controlled independently of one another. When one or more of the motors is slowing down, another motor or motors might be speeding up, or operating with load, and can use some of the regenerated power. Also, the polyphase rectifier has to supply the load plus the losses in the load, while during regeneration only the regenerated power less the losses needs to be handled.

The foregoing describes a regenerative rectifier suitable for use with adjustable frequency, adjustable voltage, ac motor drive systems or for use with adjustable voltage dc motor drive systems, which is capable of power regeneration from a dc source to an ac supply by reversing the direction of current flow in the rectifier rather than reversing the dc output polarity.

While the invention has been particularly shown and described with references to several preferred embodiments thereof, it will be understood by those skilled in the art that various changes in form and details may be made therein without departing from the spirit and scope of the invention.

What is claimed is:

1. A circuit for supplying rectified power to a load from a three phase ac source and providing single phase regeneration from the load to the three phase source, comprising:
    a three phase bridge rectifier including a plurality of rectifying elements, said rectifier adapted to be coupled to said three phase ac source;
    controllable switch means with self-commutating ability coupled in inverse parallel with each of said rectifying elements respectively, in the first and second phases of said rectifier, said controllable switch means forming a single phase inverter;
    first current sensing means for sensing current in the third phase of said rectifier;
    second current sensing means for sensing the direction of current to the load; and
    control means coupled to said switch means and said first and second current sensing means, said control means being responsive to direction and amplitude of current in the third phase of said rectifier for switching said switch means during regeneration, said control means including means for comparing relative voltages of said first and second phases of the ac source to determine conduction intervals of said switch means when providing regenerative current to the first and second phases of said source, and means coupled to said first current sensing means for pulse width modulating said controllable switch means to maintain said third phase rectifier current within predetermined positive and negative current limits.

2. The circuit in claim 1 wherein said three phase bridge rectifier comprises a full bridge rectifier.

3. The circuit in claim 2 wherein said controllable switch means comprises a bipolar transistor.

4. A circuit for supplying rectified power to a load from a three phase ac source and providing single phase regeneration from the load to the three phase source comprising:
    a three phase bridge rectifier including a plurality of rectifying elements in the first and second phases thereof and at least one controllable rectifying element in the third phase thereof, said rectifier adapted to be coupled to a three phase ac source;
    controllable switch means with self-commutating ability coupled in inverse parallel with each of said rectifying elements, respectively, in the first and second phases of said rectifier, said controllable switch means forming a single phase inverter;
    current sensing means for sensing direction of current to the load; and
    control means coupled to said switch means, said current sensing means, and said controllable rectifying elements, said control means being responsive to direction of said current for switching on said switch means during regeneration and switching on said controllable rectifying elements during rectification, said control means including means for comparing relative voltages of said first and second phases of said ac source to determine conduction intervals of said switch means when providing regenerative current to the first and second phase of said source.

5. The claim of claim 4 wherein said three phase bridge rectifier comprises a full bridge rectifier.

6. The circuit in claim 5 wherein said controllable rectifying element comprises a thyristor and said controllable switch comprises a bipolar transistor.

7. The circuit in claim 5 wherein said control means further comprises:
    means coupled to said first and second phases of said rectifier for determining the conduction interval of said controllable rectifying elements in said third phase of said rectifier dependent on the relative voltages of said three phase ac source.

* * * * *